(12) United States Patent
Buchsbaum et al.

(10) Patent No.: US 7,648,808 B2
(45) Date of Patent: Jan. 19, 2010

(54) PATTERNED COATED DICHROIC FILTER

(75) Inventors: Philip E. Buchsbaum, Oldsmar, FL (US); James D. Lane, Dunedin, FL (US)

(73) Assignee: Ocean Thin Films, Inc., Largo, FL (US)

( * ) Notice: Subject to any disclaimer, the term of this patent is extended or adjusted under 35 U.S.C. 154(b) by 739 days.

(21) Appl. No.: 10/959,800

(22) Filed: Oct. 6, 2004

(65) Prior Publication Data

US 2005/0153219 A1 Jul. 14, 2005

Related U.S. Application Data

(60) Provisional application No. 60/535,756, filed on Jan. 12, 2004.

(51) Int. Cl.
*G02B 5/20* (2006.01)
(52) U.S. Cl. .......................................... 430/7

(58) Field of Classification Search ....................... None
See application file for complete search history.

(56) References Cited

U.S. PATENT DOCUMENTS 4,313,648 A * 2/1982 Yano et al. .................. 359/587
2002/0094484 A1 * 7/2002 Buchsbaum et al. ............ 430/7

FOREIGN PATENT DOCUMENTS

WO        WO 95/17690    *  6/1995

* cited by examiner

*Primary Examiner*—John A. McPherson
(74) *Attorney, Agent, or Firm*—Dennis L. Cook, Esq.

(57) ABSTRACT

A combination patterned reflective dichroic filter and optical coating, and method of making the same, is disclosed by starting with a filter substrate, laying down a pattern of dichroic filter material, but stopping short of completing the layers required for the spectral characteristics of the filter. The spectral characteristics are completed by adding a blanket coating of a material such as an anti-reflective material. In an alternative embodiment the blanket coating can be applied prior to addition of the dichroic filter material.

36 Claims, 2 Drawing Sheets

Substrate

Patterned Coating
Substrate

Blanket Coating
Patterned Coating
Substrate

Substrate

Blanket Coating
Substrate

Patterned Coating
Blanket Coating
Substrate

PATTERNED COATED DICHROIC FILTER

CROSS-REFERENCE TO RELATED APPLICATION

The present application claims the benefit of previously filed pending Provisional Patent Application, Ser. No. 60/535,756, filed Jan. 12, 2004.

FIELD OF THE INVENTION

This invention relates, generally, to methods for making a patterned coated dichroic filter. More specifically a method for replacing several layers of the patterned dichroic materials with a blanket coating of anti-reflective or other optical coating that completes the spectral requirements of the patterned dichroics.

BACKGROUND OF THE INVENTION

Dichroic filters, also known as interference filters, are constructed by depositing one or more layers of metallic and/or dielectric films with precise thicknesses to produce filters which transmit certain wavelengths of light and reflect others. The colors of a dichroic filter can be predicted and manufactured to match spectral functions such as the CIE tristimulus curves s (e.g. the 1976 UCS standard chromaticity diagram), and such filters enable purer color filtering, reflection and transmission compared to gels due to their higher extinction ratio at wavelengths which are blocked and higher transmission at wavelengths that are passed. Dichroic filters are temperature stable from a range of about −80 degrees to 700 degrees F. They absorb less than five percent (2%) of the light transmitted through them as they are primarily rejecting out of band wavelengths through reflection. And, for in band wavelengths, they exhibit greater than ninety percent (90%) transmission thus requiring less power to achieve greater brightness. The above process is disclosed in U.S. Pat. No. 5,711,889, Method For Making Dichroic Filter Array, which is hereby fully incorporated into this specification.

The object of the present invention disclosed in this patent application is the application and patterning of a photosensitive material as outlined in U.S. Pat. No. 5,711,889 but leaving off several dichroic layers and replacing them with a coating such as an anti-reflective or other metallic or dielectric film coating to complete the spectral characteristics desired. In an alternative embodiment the coating can be applied first with the patterned dichroic layers added on top of the coating.

U.S. Pat. No. 5,756,239, Wake, May 36, 1998, Method of Forming a Color Filter Array With Improved Resolution, discloses a method for use in forming a high resolution color filter array the following steps are used: coating a colored layer containing a binder, a colorant in the binder, the binder being transparent over the entire visible electromagnetic spectrum and remaining so even after extended treatment with elevated temperature and light; hardening the colored layer; providing and patterning a photoresist layer over the hardened colored layer; and treating the patterned photoresist layer so that it is selectively resistant to oxygen plasma etch. Further processing steps are used to complete the colored filter array. U.S. Pat. No. 5,954,559, Holmberg, Sep. 21, 1999, Color Filter Structure and Method of Making, discloses an improved planar color filter structure to reduce defects in the display devices incorporating the color filter structures, including active matrix displays. A color filter substrate has a thicker polyamide black matrix formed thereon and a transparent polyamide layer formed over the black matrix. The transparent layer is exposed through the black matrix and developed to remove the unexposed portions over the black matrix. The resulting surface is substantially planar and facilitates the forming of the remaining layers to form a substantially planar color filter structure. These patents disclose use of dyes and gels patterned to form the color filter. No dichroics are used.

U.S. Pat. No. 5,889,227, Hawkins, et al, Mar. 30, 1999, Planar Color Filter Array For CCDS With Embedded Color Filter Elements, discloses an image sensor and method of making such sensor. The sensor includes an integral color filter array, comprising: a semiconductor substrate having an optically planar top surface; a plurality of spaced image pixels formed in the substrate; and an array of physically contiguous color filter elements embedded in the substrate whose top and bottom surfaces are coplanar and which have no overlap of color filter layers between adjacent color filter elements. This patent discloses a planar filter element created by etching rather than the liftoff method disclosed U.S. Pat. No. 5,711, 889, and thus is difficult to manufacture.

Also, a number of patents have been issued that disclose using dichroic filters with detectors. U.S. Pat. No. 5,942,762, Hecht, Aug. 24, 1999, CCD Scanner Having Improved Specular Reflection Discrimination, discloses an optical scanner that utilizes two linear CCD detectors and a bandpass means to improve the ability of the scanner to discriminate against specular reflection. A coded symbology is illuminated by a noncoherent light source and light reflected from the coded symbology along a first path strikes the front face of the bandpass means. The bandpass means, functioning as a notch filter, transmits a select bandwidth of light while reflecting all other light onto a first CCD detector. Simultaneously, light reflected from the bar code symbol travels along a second path, at a different angle with respect to the plane of the coded symbology than the first path, is reflected from a mirror onto the back face of the bandpass means. The bandpass means transmits the select bandwidth of light onto a second CCD detector and reflects all other light. The second CCD detector has a notch filter which permits the detection of only the select bandwidth. Since specular reflection is only experienced at a single angle, with respect to the plane of the coded symbology and each CCD detector detects an image at a different angle with respect to the plane of the coded symbology, a complete image can be reconstructed by combining information obtained from both CCD detectors. But this patent does not disclose patterning which includes coating to complete the spectral requirements.

The combination of dichroic filters and other filters, such as anti-reflective filters is typically used in lighting projectors and is usually accomplished as shown in U.S. Pat. No. 6,623, 144 which discloses a high intensity light projector for stage, architectural and similar applications includes a controllable image quality projection gate providing advanced visual effects. The projection gate, capable of selectively scattering or transmitting incident light, may be constructed of an array of scattering liquid crystal material in combination with infrared and ultraviolet reduction means which provide in the high intensity beam, a stable thermal environment by minimizing the absorption of light by the projection gate. Additional thermal efficiency is provided by supplemental cooling means. Color control is also provided in the form of dichroic filter wheels forming cooperating adjustable low, high and band width filters including saturation control. A color measuring feedback sensor is also provided. An intensity measuring feedback sensor controls a spatially-modulated, variabledensity, reflectively-coated dimming wheel. A programmable gobo system has provisions for gobo selection, orientation, and rotation.

Another example of these types of projection systems is disclosed in U.S. Pat. No. 5,168,351, which discloses a video color image projector that includes a block of crossed dichroic mirrors for combining the light rays from image rasters on respective monochrome image display devices and a projection lens for projecting the composite color rays so as to form an enlarged color image on a display screen. Each display device has a faceplace which is convex on the interior surface thereof and having thereon an interference filter in the form of an internal angularly reflecting coating (IARC). Each faceplate is liquid—coupled to a negative power lens element, so that the faceplate, coupling liquid (or gel) and such lens element effectively constitute a single negative power field flattener lens at each entrance side of the dichroic block. The composite color rays at the exit side of the dichroic block are projected on the display screen by an assembly of lens elements which includes at least one optically positive lens element. The focal length of the complete projection lens formed by such assembly and each of the negative field flattener lenses may be from 0.5 to 0.9 times the diagonal D of the image raster on each display device, so that the projector is sufficiently compact to be included in a cabinet suitable for consumer television receivers. This patent also does not disclose patterning which includes coating to complete the spectral requirements

SUMMARY OF THE INVENTION

This breakthrough in dichroic filter production is made possible by uniting two separate and divergent technologies. The art of microlithography has long been employed to produce microelectronic devices, and the optical arts have long been employed to produce dichroic filter arrays. As mentioned earlier, the optical arts have failed to produce thin filters having well-defined edges, and the art of microlithography has been limited to the field of microelectronics. The present invention merges the divergent arts of microlithography and microelectronics. A "cold process," well known in the art of microelectronics, is employed to deposit the filter material, in lieu of the conventional "hot process." Starting with a filter substrate, a releasing agent is applied to the wafer prior to the deposition thereonto of a photoresist. Then the release layer is overetched to create an undercut, thereby weakening the walls formed by the photoresist and the unetched releasing agent. The dichroic filter material is then deposited onto the wafer in the space created by the etching. The photoresist and releasing agent are then removed, thereby leaving on the wafer the filter material. This process is repeated laying down a pattern of dichroic filter material, but is stopped short of completing the layers required for the spectral characteristics of the filter. The spectral characteristics are completed by adding a blanket coating of a material such as an anti-reflective material. In an alternative embodiment the blanket coating can be applied prior to addition of the dichroic filter material.

It is therefore clear that a primary object of this invention is to advance the art of dichroic filter manufacture. It is also an object of the present invention to provide a filter with optical properties that doesn't require the use of multiple filters as found in the conventional art. A more specific object is to advance said art by providing a method for the manufacture of patterned dichroic filters having sharply defined edges which spectral requirements are completed by application of a blanket coating of other optical coating materials.

These and other important objects, features, and advantages of the invention will become apparent as this description proceeds. The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1A:
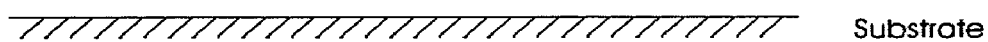
FIG. 1a is the first diagram of a method of making a patterned coated dichroic filter showing the substrate.
Figure 1B:
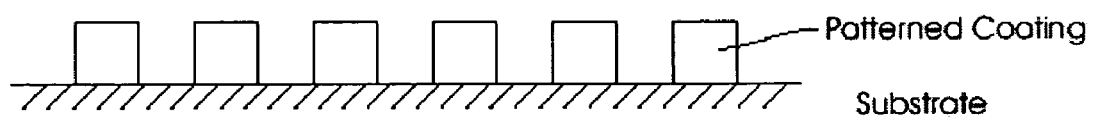
FIG. 1b is the second diagram of a method of making a patterned coated dichroic filter with a deposited dichroic material on the substrate.
Figure 1C:
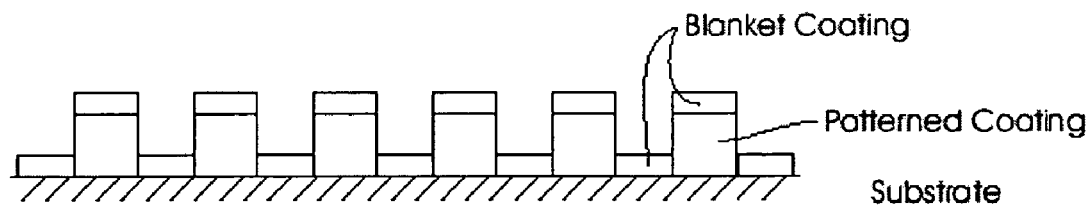
FIG. 1c is the third diagram of a method of making a patterned coated dichroic filter with a blanket coating applied after depositing the dichroics resulting in the finished filter.
Figure 2A:
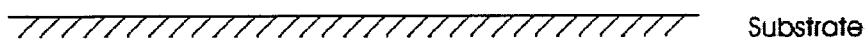
FIG. 2a is the first diagram of a method of making a patterned coated dichroic filter showing the substrate.
Figure 2B:
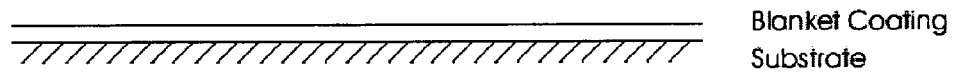
FIG. 2b is the second diagram of a method of making a patterned coated dichroic filter adding the blanked coating.
Figure 2C:
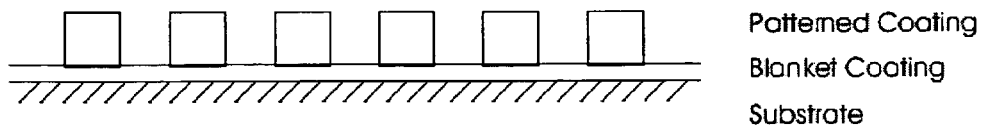
FIG. 2c is the third diagram of a method of making a patterned coated dichroic filter with the blanked coating and adding the dichroics resulting in the finished filter.

As shown in FIGS. 1a, 1b, and 1c the method and filter of the preferred embodiment begins with the application and patterning of a photosensitive material (not shown) on a substrate (1) as outlined in U.S. Pat. No. 5,711,889 but leaving off several dichroic layers of the patterned dichroic material (2) and replacing them with a blanket coating (3) such as an anti-reflective coating to complete the spectral characteristics desired. The steps as described in U.S. Pat. No. 5,711,899 are generally patterning photoresist on a substrate and masking pre-selected areas of said substrate via proximity, contact printing or other masking techniques well known in the art (1) and coating a dichroic material (2) in the desired pattern. In most cases, but not all, multiple alternating layers of $SiO_2$ and $Ta_2O_5$ are applied while lifting off the photoresist to form the patterned dichroic material (2). Then the whole surface is coated with an anti-reflective blanket coating (3) which, when combined with the patterned dichroic material (2), completes the spectral performance of that patterned dichroic material (2) section and, in the clear areas (4), provides an anti-reflective blanket coating (3). The final product produced by this method is shown in FIG. 1(c). In an alternative embodiment shown in FIGS. 2a, 2b, and 2c the steps can be reversed by applying the anti-reflective blanket coating (3) first on the substrate (2) and placing the patterned dichroic material (3) on top of the coating. The resulting filter of this alternative embodiment is shown in FIG. 2(c).

Of course it will be obvious to those skilled in the art after reading this disclosure that the blanket coating (3) does not have to be confined to an anti-reflective coating. The novel aspect of this disclosure is to pattern a filter material (2) on a substrate (1) and also apply a blanket coat (3) on a substrate (1), with the final surface of the filter comprising the sum of the spectral characteristics of the blanket coating (3) and filter materials (2), and, the blanket coating (3) by itself covering the rest of the filter (4). This disclosure also includes multiple patterns that overlap, and alternative methods of lift-off and etching, which create the combined finished filter as may be envisioned by those skilled in the art.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

What is claimed is:

1. A method for manufacturing a patterned coated dichroic filter, comprising the steps of:
   a. cleaning a wafer;
   b. applying a photoresist to said wafer;
   c. masking pre-selected areas of said photoresist;
   d. developing unmasked areas of said photoresist to create a pre-selected space on a predetermined section of said wafer;
   e. over-developing said photoresist layer to form an undercut in said photoresist layer and to expose said predetermined section of said wafer;
   f. depositing dichroic filter material on said predetermined section of said wafer;
   g. removing said photoresist;
   h. repeating the foregoing steps if required to deposit a predetermined number of dichroic filters on said wafer in a predetermined array; and,
   i. depositing a blanket coating of a material to the wafer such that the combination of dichroic filter material and blanket coating meet the desired spectral properties of the patterned coated dichroic filter.

2. The method of claim 1, wherein said photoresist is applied to said wafer until said photoresist has a thickness of about 0.8 to 2.5 microns, and said photoresist is baked to remove solvents therefrom.

3. The method of claim 1, further comprising the step of cleaning said wafer after said step of over-developing.

4. The method of claim 1, further comprising the step of cleaning said wafer after said step of over-developing.

5. The method of claim 4, wherein the step of cleaning said wafer is performed by placing it in a vacuum coating chamber and ion bombarding said wafer with argon.

6. The method of claim 1, wherein the dichroic filter material is deposited onto said wafer by employing electron beam deposition with ion assist specific for a preselected color bandpass.

7. The method of claim 6, wherein the electron beam deposition with ion assist deposits alternating nonquarterwave high low index stacks of silicone dioxide and titanium dioxide onto said wafer.

8. The method of claim 7, wherein the silicone dioxide is deposited at a rate of one angstrom per second and the titanium dioxide is deposited at a rate of three angstroms per second.

9. The method of claim 6, wherein in said electron beam deposition with ion assist deposits alternating nonquarterwave high low index stacks of dichroic filter material and further consists of depositing low index material at a rate of 2 to 15 angstrom per second and depositing high index material at a rate of 1 to 15 angstroms per second onto said wafer.

10. The method of claim 1, wherein said blanket coating fills in the clear areas of the wafer.

11. The method of claim 1, wherein said blanket coating is an anti-reflective material.

12. The method of claim 1, wherein said blanket coating replaces several layers of dichroic material.

13. The method of claim 1, wherein said blanket coating is deposited having sharply defined edges.

14. The method of claim 1, wherein said blanket coating is deposited to form multiple pattern overlapping.

15. The method of claim 1, wherein said blanket coating is an anti-fogging material.

16. The method of claim 1, wherein said blanket coating is a corrosion resistant material.

17. The method of claim 1, wherein said blanket coating is a thermally resistant material.

18. The method of claim 1, wherein said blanket coating is a permeation barrier.

19. A method for manufacturing a patterned coated dicbroic filter, comprising the steps of:
   a. cleaning a wafer;
   b. depositing a blanket coating of a material to the wafer;
   c. applying a photoresist to said wafer;
   d. masking pre-selected areas of said photoresist;
   e. developing unmasked areas of said photoresist to create a pre-selected spaceon a predetermined section of said wafer;
   f. over-developing said photoresist layer to form an undercut in said photoresist layer and to expose said predetermined section of said wafer;
   g. depositing dichroic filter material on said predetermined section of said wafer;
   h. removing said photoresist; and
   i. repeating the foregoing steps if required to deposit a predetermined number of dichroic filters on said wafer in a predetermined array such that the combination of dichroic filter material and blanket coating meet the desired spectral properties of the patterned coated dichroic filter.

20. The method of claim 19, wherein said photoresist is applied to said wafer until said photoresist has a thickness of about 0.8 to 2.5 microns, and said photoresist is baked to remove solvents therefrom.

21. The method of claim 19, further comprising the step of cleaning said wafer after said step of over-developing.

22. The method of claim 19, further comprising the step of cleaning the wafer after said step of over-developing.

23. The method of claim 22, wherein the step of cleaning said wafer is performed by placing it in a vacuum coating chamber and ion bombarding said wafer with argon.

24. The method of claim 19, wherein the dichroic filter material is deposited onto said wafer by employing electron beam deposition with ion assist specific for a preselected color bandpass.

25. The method of claim 24, wherein the electron beam deposition with ion assist deposits alternating nonquarterwave high low index stacks of silicone dioxide and titanium dioxide onto said wafer.

26. The method of claim 25, wherein the silicone dioxide is deposited at a rate of one angstrom per second and the titanium dioxide is deposited at a rate of three angstroms per second.

27. The method of claim 24, wherein in said electron beam deposition with ion assist deposits alternating nonquarterwave high low index stacks of dichroic filter material and further consists of depositing low index material at a rate of 2 to 15 angstrom per second and depositing high index material at a rate of 1 to 15 angstroms per second onto said wafer.

28. The method of claim 19, wherein said blanket coating fills in the clear areas of the filter 29. The method of claim 19, wherein said blanket coating is an anti-reflective material.

30. The method of claim 19, wherein said blanket coating replaces several layers of dichroic material.

31. The method of claim 19, wherein said blanket coating is deposited having sharply defined edges.

32. The method of claim 19, wherein said blanket coating is deposited in order to form multiple pattern overlapping.

33. The method of claim 19, wherein said blanket coating is an anti-fogging material.

34. The method of claim 19, wherein said blanket coating is a corrosion resistant material.

35. The method of claim 19, wherein said blanket coating is a thermally resistant material.

36. The method of claim 19, wherein said blanket coating is a permeation barrier.

* * * * *